(12) United States Patent
Ethier-Majcher et al.

(10) Patent No.: US 12,067,460 B2
(45) Date of Patent: Aug. 20, 2024

(54) METHODS AND CIRCUITS FOR PERFORMING TWO-QUBIT QUANTUM GATES

(71) Applicant: ANYON SYSTEMS INC., Dorval (CA)

(72) Inventors: Gabriel Ethier-Majcher, Montreal (CA); Claudéric Ouellet-Plamondon, Montréal (CA); Alireza Najafi-Yazdi, Vaudreuil-Dorion (CA)

(73) Assignee: ANYON SYSTEMS INC., Dorval (CA)

( * ) Notice: Subject to any disclaimer, the term of this patent is extended or adjusted under 35 U.S.C. 154(b) by 0 days.

(21) Appl. No.: 18/077,520

(22) Filed: Dec. 8, 2022

(65) Prior Publication Data

US 2024/0070502 A1    Feb. 29, 2024

Related U.S. Application Data

(60) Provisional application No. 63/287,591, filed on Dec. 9, 2021.

(51) Int. Cl.
   *G06N 10/20* (2022.01)
   *G06N 10/40* (2022.01)

(52) U.S. Cl.
   CPC .............. *G06N 10/20* (2022.01); *G06N 10/40* (2022.01)

(58) Field of Classification Search
   CPC ................................ G06N 10/20; G06N 10/40
   See application file for complete search history.

(56) References Cited

U.S. PATENT DOCUMENTS

| | | | |
|---|---|---|---|
| 6,900,456 B2 * | 5/2005 | Blais | B82Y 10/00 257/14 |
| 9,996,801 B2 | 6/2018 | Shim et al. | |
| 10,056,908 B2 * | 8/2018 | Rigetti | H04L 9/0852 |
| 10,353,844 B2 * | 7/2019 | Naaman | G06N 10/00 |
| 11,476,836 B1 | 10/2022 | Goto | |
| 11,482,656 B2 | 10/2022 | Neill et al. | |
| 11,751,489 B2 * | 9/2023 | Finck | G06N 10/40 327/366 |
| 2020/0112310 A1 * | 4/2020 | Najafi-Yazdi | G06N 10/00 |
| 2021/0036206 A1 * | 2/2021 | Neill | H10N 60/805 |
| 2021/0406746 A1 * | 12/2021 | Stehlik | H01L 29/66977 |
| 2022/0246677 A1 | 8/2022 | Kelly et al. | |
| 2022/0269968 A1 | 8/2022 | Noguchi et al. | |

(Continued)

OTHER PUBLICATIONS

Huikai Xu, et. al.; Realisation of adiabatic and diabatic CZ gates in superconducting qubits coupled with a tunable coupler; Nov. 7, 2020 (Year: 2020).*

(Continued)

*Primary Examiner* — Kurtis R Bahr
(74) *Attorney, Agent, or Firm* — NORTON ROSE FULBRIGHT CANADA LLP

(57) ABSTRACT

There is described a method for performing a two-qubit gate. The method comprises coupling a first qubit to a second qubit, and coupling a third qubit to the first qubit and to the second qubit, wherein the third qubit is a coupler. A drive signal is applied to the coupler to perform the two-qubit gate on the first qubit and the second qubit by driving the coupler, the drive signal creating coupling between eigenstates of a Hamiltonian of the coupler.

20 Claims, 10 Drawing Sheets

(56) References Cited

U.S. PATENT DOCUMENTS

2022/0358392 A1* 11/2022 Satzinger .............. G06N 10/70
2022/0374752 A1  11/2022 Huang et al.
2022/0374755 A1  11/2022 Didier
2022/0376161 A1  11/2022 Goto et al.

OTHER PUBLICATIONS

Sung et al., "Realization of high-delity CZ and ZZ-free iSWAP gates with a tunable coupler", arXiv:2011.01261v3, Research Laboratory of Electronics, Massachusetts Institute of Technology, Jun. 17, 2021.

Di Paolo et al., "Extensible circuit-QED architecture via amplitude- and frequency-variable microwaves", arXiv:2204.08098v2, Research Laboratory of Electronics, Massachusetts Institute of Technology, Apr. 19, 2022.

Arute et al., "Quantum supremacy using a programmable superconducting processor", vol. 574, https://doi.org/10.1038/s41586-019-1666-5, Oct. 23, 2019, pp. 507-511.

Huikai, X. et al., "Realisation of adiabatic and diabatic CZ gates in superconducting qubits coupled with a tunable coupler", Nov. 7, 2020 (Nov. 7, 2020), Retrieved from the Internet: URL: https://arxiv.org/pdf/2010.14053.pdf.

Li et al., "Realization of fast all-microwave CZ gates with a tunable coupler", Department of Modern Physics, University of Science and Technology of China, arXiv:2202.06616v1, Feb. 14, 2022.

* cited by examiner

METHODS AND CIRCUITS FOR PERFORMING TWO-QUBIT QUANTUM GATES

CROSS-REFERENCE TO RELATED APPLICATIONS

The present disclosure claims the benefit of U.S. Provisional Patent Application No. 63/287,591 filed on Dec. 9, 2021, the contents of which are hereby incorporated by reference in their entirety.

TECHNICAL FIELD

The present disclosure generally relates to quantum computing, and more particularly to quantum logic gates for quantum circuits.

BACKGROUND OF THE ART

Quantum computers are machines that harness the properties of quantum states, such as superposition, interference, and entanglement, to perform computations. In a quantum computer, the basic unit of memory is a quantum bit, or qubit. A quantum computer with enough qubits has a computational power inaccessible to a classical computer, which is referred to as "quantum advantage".

Quantum calculations are carried out on qubits by performing a series of fundamental operations, known as quantum logic gates, or simply quantum gates. There are many different types of quantum gates. Single-qubit gates are applied to only one qubit at a time, and can flip a qubit from 0 to 1 (and vice versa) as well as allow superposition states to be created. Two-qubit gates are applied to two qubits concurrently, allowing the two qubits to interact with each other and create quantum entanglement.

According to quantum theorem, any unitary transformation on any number of qubits n can be decomposed as a product of one-qubit and two-qubit gates. Therefore, if quantum gates can work in a reliable manner, they can be used to run all possible algorithms on quantum computers.

SUMMARY

In accordance with a broad aspect, there is provided a method for performing a two-qubit gate. The method comprises coupling a first qubit to a second qubit, and coupling a third qubit to the first qubit and to the second qubit, wherein the third qubit is a coupler. A drive signal is applied to the coupler to perform the two-qubit gate on the first qubit and the second qubit by driving the coupler, the drive signal creating coupling between eigenstates of a Hamiltonian of the coupler.

In some embodiments, the first qubit, the second qubit, and the third qubit are superconducting qubits. For example, the superconducting qubits may be transmon or differential transmon qubits.

In some embodiments, the first qubit and the second qubit are fixed-frequency qubits and the third qubit is a tunable-frequency qubit. In some embodiments, the first qubit and the second qubit are tunable-frequency qubits and the third qubit is fixed frequency. In some embodiments, the first, second and third qubits are tunable-frequency qubits. Any combination of fixed and tunable frequency qubits may be used.

In some embodiments, the drive signal is a Radio Frequency (RF) signal, i.e. a signal comprising one or more frequency components within the RF frequency range of 1 GHz to 20 GHz. In some embodiments, the drive signal is resonant or nearly-resonant with the coupler, producing non-zero population in any excited states of the coupler. In other embodiments, the drive signal is off-resonance from the coupler, resulting in a negligible population in the coupler excited states but producing a frequency shift in the coupler while driving the coupler.

In some embodiments, the drive signal produces a non-zero population in a first excited state of the coupler. In some other embodiments, the drive signal excites higher energy states of the coupler. For example, applying the drive signal to the coupler comprises applying the drive signal at a transition frequency to populate higher energy states of the coupler. In another example, applying the drive signal to the coupler comprises using multi-photon absorption to populate higher energy states of the coupler. In yet another example, applying the drive signal to the coupler comprises applying multiple signals at different frequencies to transfer a population successively from one excited state to another excited state of the coupler.

In some embodiments, coupling the first qubit to the second qubit comprises coupling capacitively, and coupling the third qubit to the first qubit and to the second qubit comprises coupling capacitively. In some embodiments, the drive signal is applied through a transmission line capacitively coupled to the coupler.

In some embodiments, the drive signal is applied to a transmission line shared between the coupler and the first or the second qubit.

In some embodiments, the first qubit and the second qubit are operated at a same frequency. In some embodiments, the first qubit and the second qubit are operated at different frequencies.

In some embodiments, applying the drive signal to the coupler comprises applying a $2\pi$ pulse to the coupler. In some embodiments, applying the drive signal to the coupler comprises applying a fixed-frequency signal with a modulated amplitude.

In some embodiments, the two-qubit gate is an iSWAP gate. In some embodiments, the two-qubit gate is a CZ gate. In some embodiments, the two-qubit gate is a fermionic simulation gate.

Features of the systems, devices, and methods described herein may be used in various combinations, in accordance with the embodiments described herein.

BRIEF DESCRIPTION OF THE DRAWINGS

Reference is now made to the drawings, in which.

DETAILED DESCRIPTION

Figure 1:
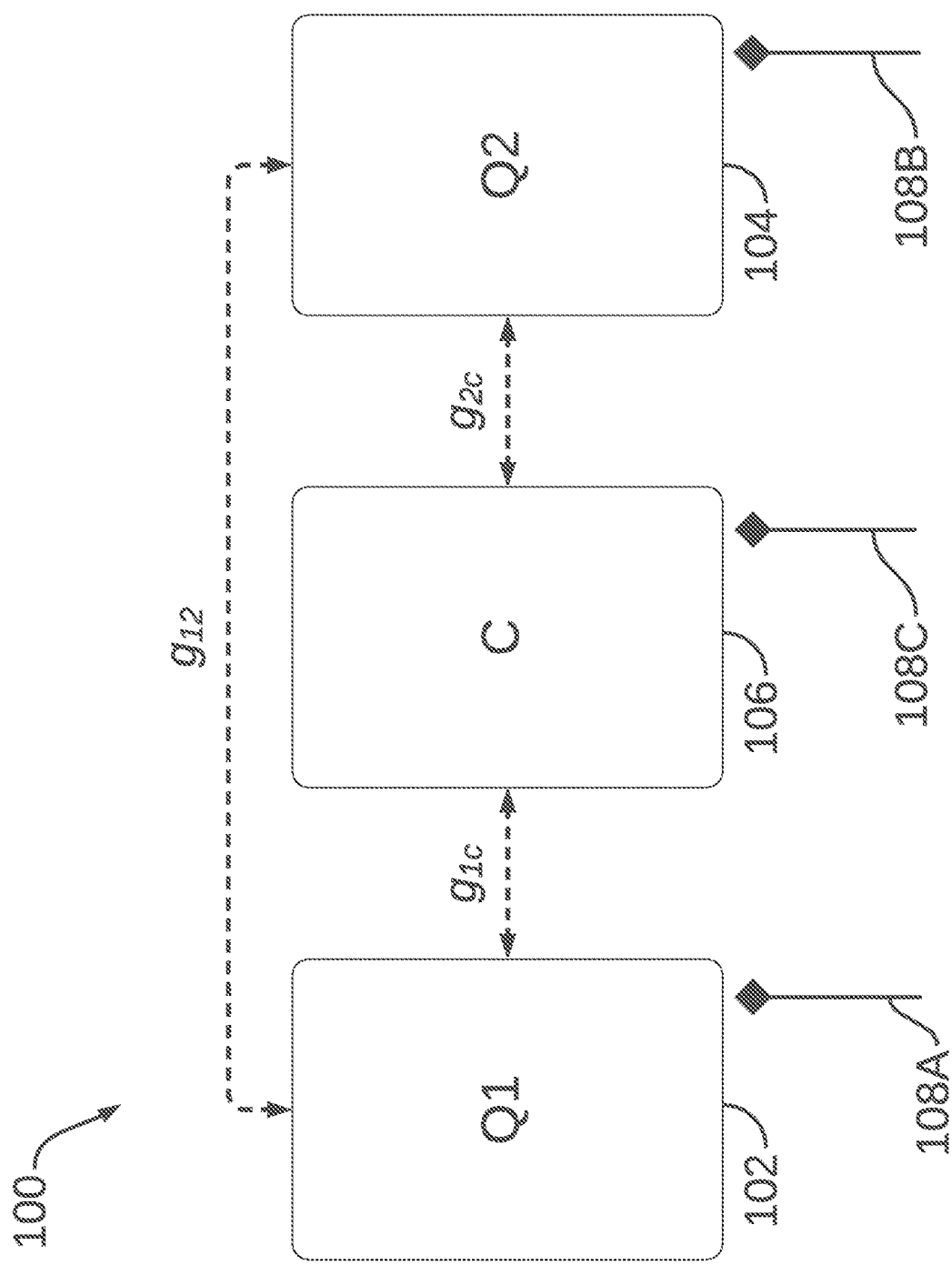
FIG. 1 is a schematic of a quantum circuit having two qubits and a coupler in accordance with a first embodiment.

The present disclosure is directed to methods and circuits for performing two-qubit gates on quantum circuits. With reference to FIG. 1, there is illustrated a circuit 100 composed of a first qubit 102, a second qubit 104, and a coupler 106. The first qubit 102 is directly coupled to the coupler 106 via a coupling strength $g_{1c}$, which may involve capacitive coupling, inductive coupling, or other known coupling types. The second qubit 104 is directly coupled to the coupler 106 via a coupling strength $g_{2c}$, which may involve capacitive coupling, inductive coupling, or other known coupling types. First and second qubits 102, 104 are also directly coupled via a coupling strength $g_{12}$, which may involve capacitive coupling, inductive coupling, or other known coupling types.

In some embodiments, the qubits 102, 104 are superconducting qubits, such as but not limited to charge qubits, flux qubits, phase qubits, and the like. In some embodiments, the qubits 102, 104 are transmon qubits or differential transmon qubits. In other embodiments, the qubits 102, 104 are spin qubits or any quantum object having a plurality of discrete levels out of which at least two levels can be selectively addressed. For example, a qubit may consist in an anharmonic resonator.

Each qubit 102, 104 may be associated with a transmission line 108 for control thereof. The transmission lines 108A, 108B are used to perform gating operations on one or more of the qubits 102, 104 by transmitting drive signals thereto. In this case, the transmission lines 108A, 108B may be called "gate lines". In some embodiments, one or more of the qubits 102, 104 are frequency tunable and the transmission lines 108A, 108B may be used to tune the frequency thereof. In this case, the transmission lines 108A, 108B may be called "flux lines". Separate gate lines and flux lines may be provided, or single transmission lines 108A, 108B may be used for both gating and flux-tuning.

Qubits 102, 104 may be data qubits, for example in a quantum processor. The coupler 106 is also implemented as a qubit, referred to herein as a coupling qubit. In some embodiments, the coupling qubit 106 has the same architecture as the data qubits 102, 104. However, qubits 102, 104 and coupler 106 need not be of the same type. The coupler 106 may be a fixed-frequency qubit or a tunable-frequency qubit. In some embodiments, the circuit 100 comprises two fixed-frequency data qubits 102, 104 and one tunable-frequency coupling qubit 106. In some embodiments, the circuit 100 comprises three tunable-frequency qubits 102, 104, 106. In some embodiments, the circuit 100 comprises two tunable-frequency qubits and a fixed-frequency coupling qubit. Any combination of fixed frequency and tunable frequency qubits may be used.

A two-qubit gate can be performed by applying a drive signal to the coupler 106 through a transmission line 108C to drive the coupler 106. As used herein, a "drive signal" is understood to mean a signal that when applied to a coupler, creates coupling between eigenstates of the Hamiltonian of the coupler. This can lead to exciting a population in the coupler (when a resonant drive signal is applied) or changing the frequency of the coupler (when a non-resonant drive signal is applied). In both cases, a coupling term is created in the Hamiltonian and an interaction between two or more eigenstates of the coupler occurs. The interaction does not necessarily lead to creating a population if the non-resonant frequency of the drive signal is far enough from the frequency of the coupler. In contrast, a flux signal or tuning signal changes parameters of the Hamiltonian but does not introduce any coupling between the eigenstates. This can lead to changes in the frequency of the coupler but differs from the drive signal in its absence of a coupling effect.

Figure 2:
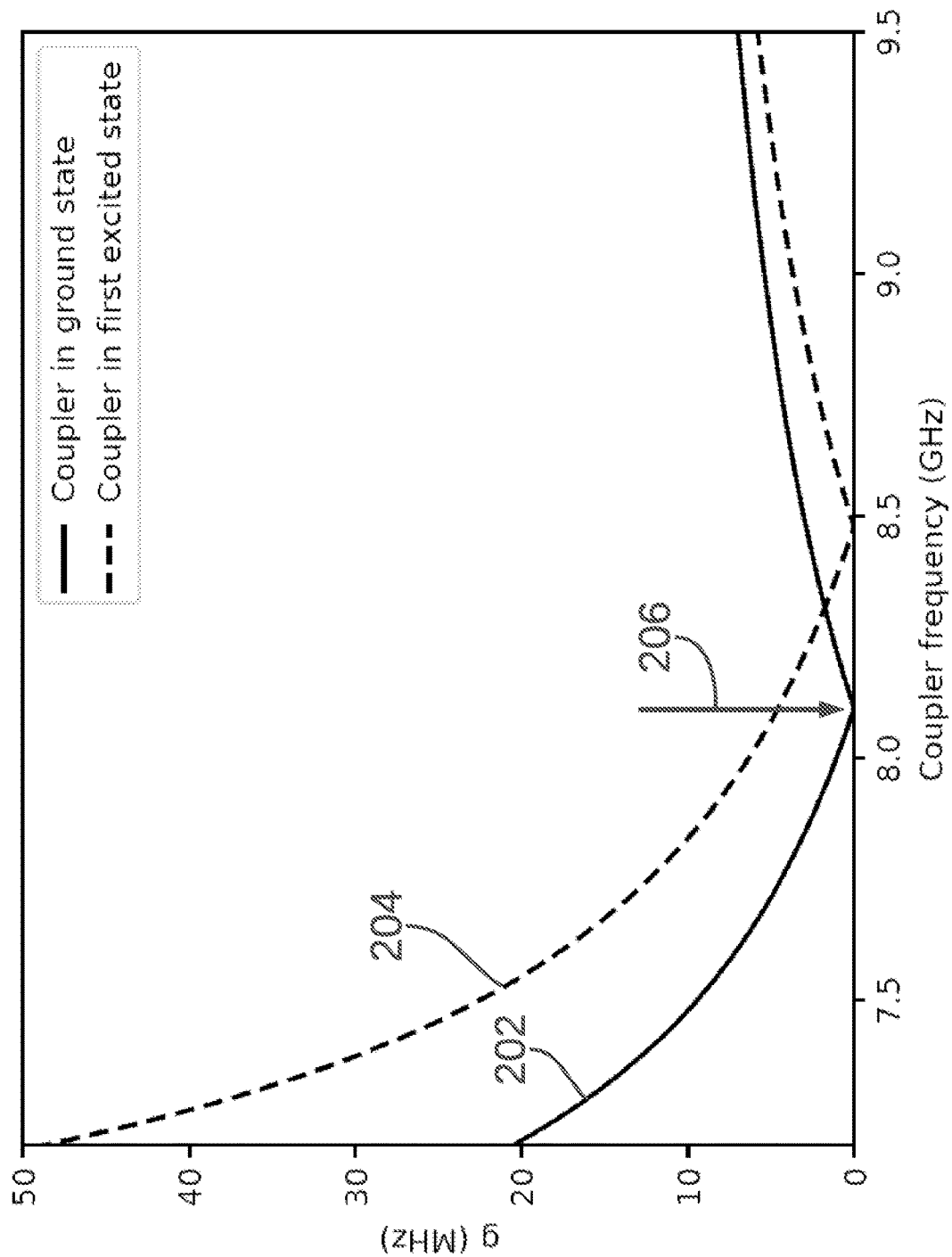
FIG. 2 is a graph showing an example of the effective coupling strength between two data qubits as a function of the energy of a coupling qubit in its ground or excited state.

With reference to FIG. 2, there are shown two curves 202, 204 illustrating the effective coupling strength between qubits 102, 104 as a function of the coupling energy (or frequency) of the coupling qubit 106. Curve 202 corresponds to the coupling qubit 106 being in its ground state, curve 204 corresponds to the coupling qubit 106 being in its first excited state. As shown, curves 202, 204 are offset from each other, thus demonstrating that the effective coupling strength can be changed by fixing the frequency of the coupling qubit 106 and exciting the coupling qubit 106. The frequency indicated by arrow 206 is a frequency for which there is no effective coupling between the two qubits 102, 104 when the coupler 106 is in its ground state, and for which there is important effective coupling between the two qubits 102, 104 when the coupler 106 is in its excited state. Therefore, the effective coupling strength of qubits 102, 104 is expected to be proportional to the population of the coupler 106 in the excited state. The coupler 106 may be excited by providing drive signal resonant with the coupler in the transmission line 108C.

A two-qubit gate may be implemented by exciting higher energy states of the coupler 106. Higher energy states can be populated by using a drive signal detuned from the coupler resonance by a fraction of the coupler's anharmonicity in order to implement multi-photon absorption, or by using multiple drive signals at different frequencies to transfer the population successively from one excited state to another excited state. For example, population can be transferred to the second excited state of the coupler by applying a first drive signal at the coupler resonance frequency and a second drive signal at a frequency detuned from the coupler resonance frequency by the coupler anharmonicity.

A two-qubit gate can also be performed by applying a non-resonant drive signal to the coupler 106. A non-resonant drive signal results in a frequency shift of the coupler 106 which is function of the drive amplitude and its detuning from the coupler resonance. Since the effective coupling strength between the data qubits 102, 104 depends on the coupler frequency, as illustrated in FIG. 2, a two-qubit gate can be performed by modulating the amplitude (or detuning) of a non-resonant drive signal driving the coupler 106.

If the frequencies of the qubits 102, 104 and coupler 106 are such that there is non-zero coupling between qubits 102 and 104 when the coupler 106 is not driven, the circuit 100 can be tuned to a proper operating point through at least one of the transmission lines 108A, 108B, 108C. In the case of transmon qubits, the frequency of the qubits may be located in the microwave range, between about 3 and 12 GHz. Changing the DC level of a flux-tuning signal, which may be applied through transmission line 108A, 108B, 108C or a separate transmission line dedicated to flux-tuning, modifies the frequency of the qubit coupled to the line and can thus be used to ensure that there is no coupling between qubits 102, 104 when the coupler 106 is not driven. Flux-tuning the coupler 106 allows the desired frequency indicated by the arrow 206 to be selected, flux-tuning one or both of the data qubits 102, 104 affects the curves 202, 204 and shifts the no-coupling frequency 206. In the case where the coupler 106 is flux-tuned, the transmission line 108C may be for both flux-tuning and gating. A pulsed flux-tuning signal can be provided through the transmission line 108C concurrently with a drive signal for gating. Alternatively, transmission line 108C is only for gating with a drive signal and an additional transmission line (not shown) may be used for flux-tuning.

Figure 3:
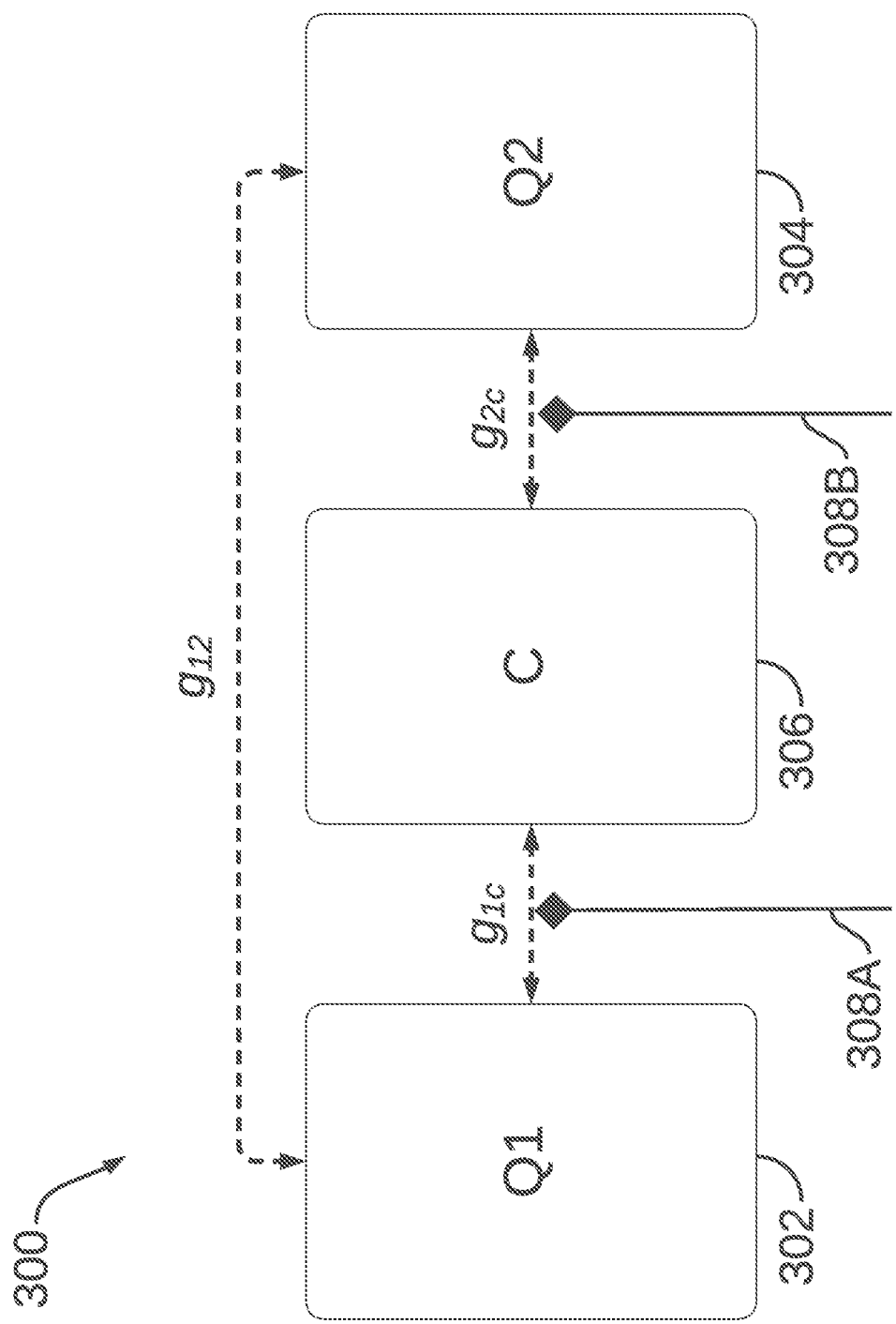
FIG. 3 is a schematic of a quantum circuit having two qubits and a coupler in accordance with a second embodiment.

In some embodiments, a transmission line is shared between a qubit and a coupler, and implementing a two-qubit gate comprises applying a drive signal to the coupler through the shared transmission line. An example is shown in FIG. 3. A circuit 300 comprises qubits 302, 304 and coupler 306. Similarly to the example shown in FIG. 1, the coupler 306 is a coupling qubit, which may be a superconducting qubit, a spin qubit, or any other quantum object having a plurality of discrete levels out of which at least two levels can be selectively addressed. Transmission line 308A is shared by qubit 302 and coupler 306. Transmission line 308B is shared by qubit 304 and coupler 306. In this example, a two-qubit gate may be performed through either one of transmission line 308A or 308B, by applying a drive signal to the coupler 306 to create coupling between eigenstates of a Hamiltonian of the coupler 306. The transmission lines 308A, 308B may be used exclusively for gating, or for gating and flux-tuning, as applicable.

Figure 4:
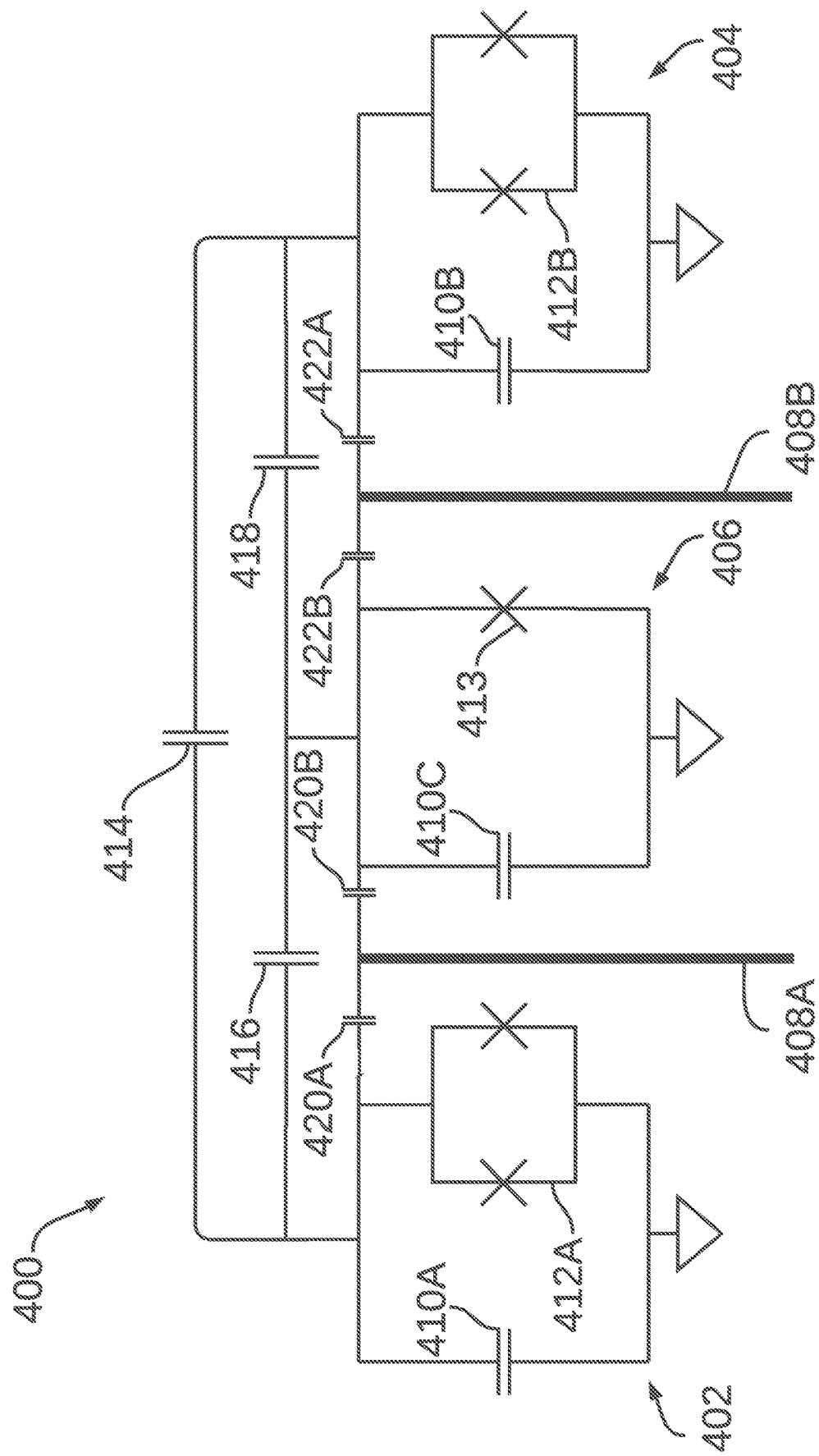
FIG. 4 is a circuit diagram of a quantum circuit having two qubits and a coupler in accordance with the schematic of FIG. 3.

FIG. 4 is a specific and non-limiting example of the circuit 300. Two transmon qubits 402, 404 are connected to a coupler 406, also a transmon qubit, that acts as a coupling qubit for the circuit 400. Qubit 402 is composed of a capacitor 410A connected in parallel with a SQUID 412A formed of two Josephson junctions. Qubit 404 is composed of a capacitor 410B connected in parallel with a SQUID 412B formed of two Josephson junctions. Although qubits 402, 404 are illustrated with a frequency-tunable architecture, the SQUIDs 412A, 412B may be replaced with single Josephson junctions such that the qubits 402, 404 are of fixed-frequency. Coupler 406 is composed of a capacitor 410C connected in parallel with a single Josephson junction 413 which could also be replaced by a SQUID. Coupler 406 is capacitively coupled to qubit 402 via capacitor 416, and is capacitively coupled to qubit 404 via capacitor 418. Qubits 402, 404 are directly coupled via capacitor 414. A transmission line 408A is shared between qubit 402 and coupler 406. The transmission line 408A is capacitively coupled to qubit 402 via capacitor 420A, and capacitively coupled to coupler 406 via capacitor 420B. A transmission line 408B is shared between qubit 404 and coupler 406. The transmission line 408B is capacitively coupled to qubit 404 via capacitor 422A, and capacitively coupled to coupler 406 via capacitor 422B.

The transmission lines 408A, 408B are used to perform single-qubit gates on qubits 402, 404 respectively by applying drive signals thereto. In addition, transmission lines 408A, 408B are used to perform two-qubit gates on qubits 402 and 404 by applying a drive signal to either one of the transmission lines 408A, 408B to drive the coupler 406 and create coupling between eigenstates of a Hamiltonian of the coupler 406. Using this architecture, the circuit 400 does not need to include a coupler-specific transmission line. This approach reduces the overall number of control lines introduced into the cryostat hosting the quantum processor. The approach also reduces complexity associated with flux-tuning of the coupler by eliminating the need for flux crosstalk and settling tail calibrations.

Figure 5:
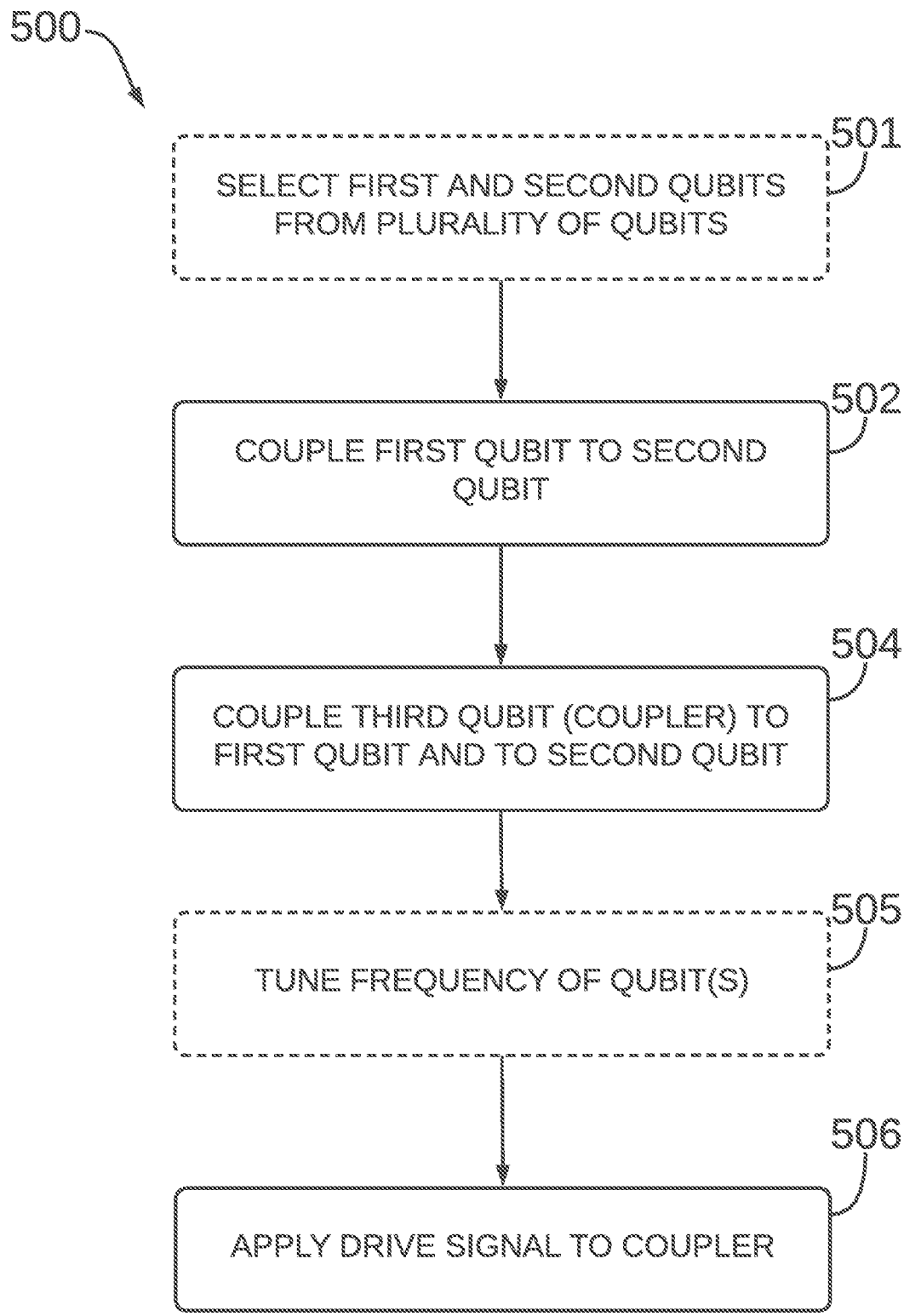
FIG. 5 is a flowchart of an example method for performing a two-qubit quantum gate.

With additional reference to FIG. 5, there is illustrated a method 500 for performing a two-qubit gate, for example using any one of the circuits 100, 300, 400. At step 502, first and second qubits are coupled together. For example, qubits 402, 404 are directly coupled through capacitor 414, but could also be coupled inductively or through another coupling mechanism. At step 504, a third qubit, acting as a coupler, is coupled to the first and second qubits. For example, coupler 406 is capacitively coupled to qubit 402 via capacitor 416 and to qubit 404 via capacitor 418. Alternatively, coupler 406 may be coupled to qubits 402, 404 inductively or through another coupling mechanism. At step 506, a drive signal is applied to the coupler in order to perform a two-qubit gate on the first and second qubit, for example through transmission line 108C from circuit 100. In some embodiments, the drive signal is a 10 to 500 ns Gaussian pulse modulated at a frequency in the microwave range, such as between 3 and 12 GHz, between 4 and 9 GHz, or between 6 and 8 GHz. In some embodiments, the Gaussian pulse has a duration between 20 ns and 100 ns. In some embodiments, the Gaussian pulse has a duration between 20 ns and 60 ns. Other signal parameters are also considered.

In some embodiments, the transmission line through which the drive signal is applied is shared with the first or second qubit, such as transmission line 408A or transmission line 408B. The drive signal has the effect of creating coupling between eigenstates of the coupler's Hamiltonian, thus causing a change in effective coupling strength between qubits 402 and 404. In some embodiments, a population is produced in the first excited state of the coupler. In some embodiments, one or more higher energy states of the coupler are populated by the drive signal, which may be a single pulse or multiple successive pulses. In other embodiments, the coupler frequency is shifted by a non-resonant drive signal.

In some embodiments, the method 500 may further comprise a step 501 of selecting a pair of qubits on which to perform the two-qubit gate, the pair of qubits selected from a plurality of qubits. As such, the two-qubit gate may be applied to any pair of data qubits separated by a coupling qubit amongst a plurality of qubits.

In some embodiments, the method 500 may further comprise a step 505 of tuning one or more qubits in the circuit. For example, tuning may be performed to set the circuit to the proper operating point, such that there is zero coupling between first and second qubits when the coupler is not driven. Tuning may be performed by applying a flux signal to a transmission line associated with a qubit targeted for tuning, so as to induce a magnetic flux in a SQUID of the target qubit. The transmission line to which the flux signal is applied may be separate from the transmission line used for the drive signal or it may be the same transmission line.

Figure 6:
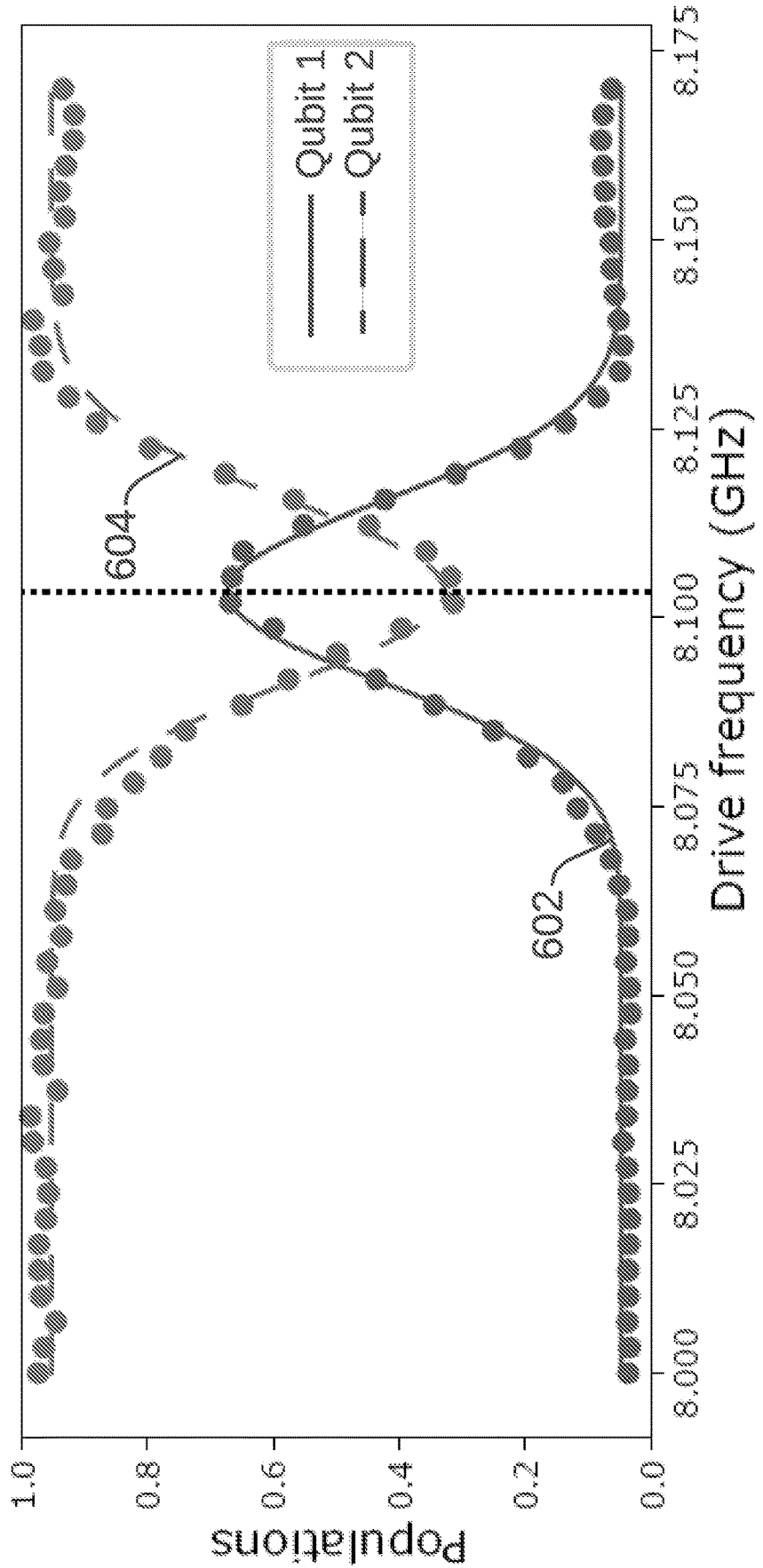
FIG. 6 is a graph showing an example of the population of two qubits as a function of the frequency of a drive signal applied to a coupler.

FIGS. 6 to 9 illustrate experimental results measured on a superconducting circuit such as that illustrated in FIG. 4, demonstrating that a drive signal applied to the coupler 406 can perform a two-qubit gate on qubits 402, 404 (labeled Qubit 1 and Qubit 2 respectively). In some embodiments, the two-qubit gate is an iSWAP gate. FIG. 6 plots the population of each data qubit as a function of the frequency of the drive signal applied to the coupler. The frequency of the coupler is kept constant at a frequency corresponding to zero effective coupling between the qubits when the coupler is in its ground state. A π pulse is applied to Qubit 2 before driving the coupler such that Qubit 2 is in state |1⟩ while Qubit 1 is in state |0⟩ before they start interacting. During the interaction, Qubit 1 and Qubit 2 are in resonance. Curves 602 and 604 show a population swap from Qubit 2 to Qubit 1 when the drive frequency is 8.104 GHz, i.e. when the drive signal is in resonance with the coupler, creating a population in the coupler's excited state.

Figure 7:
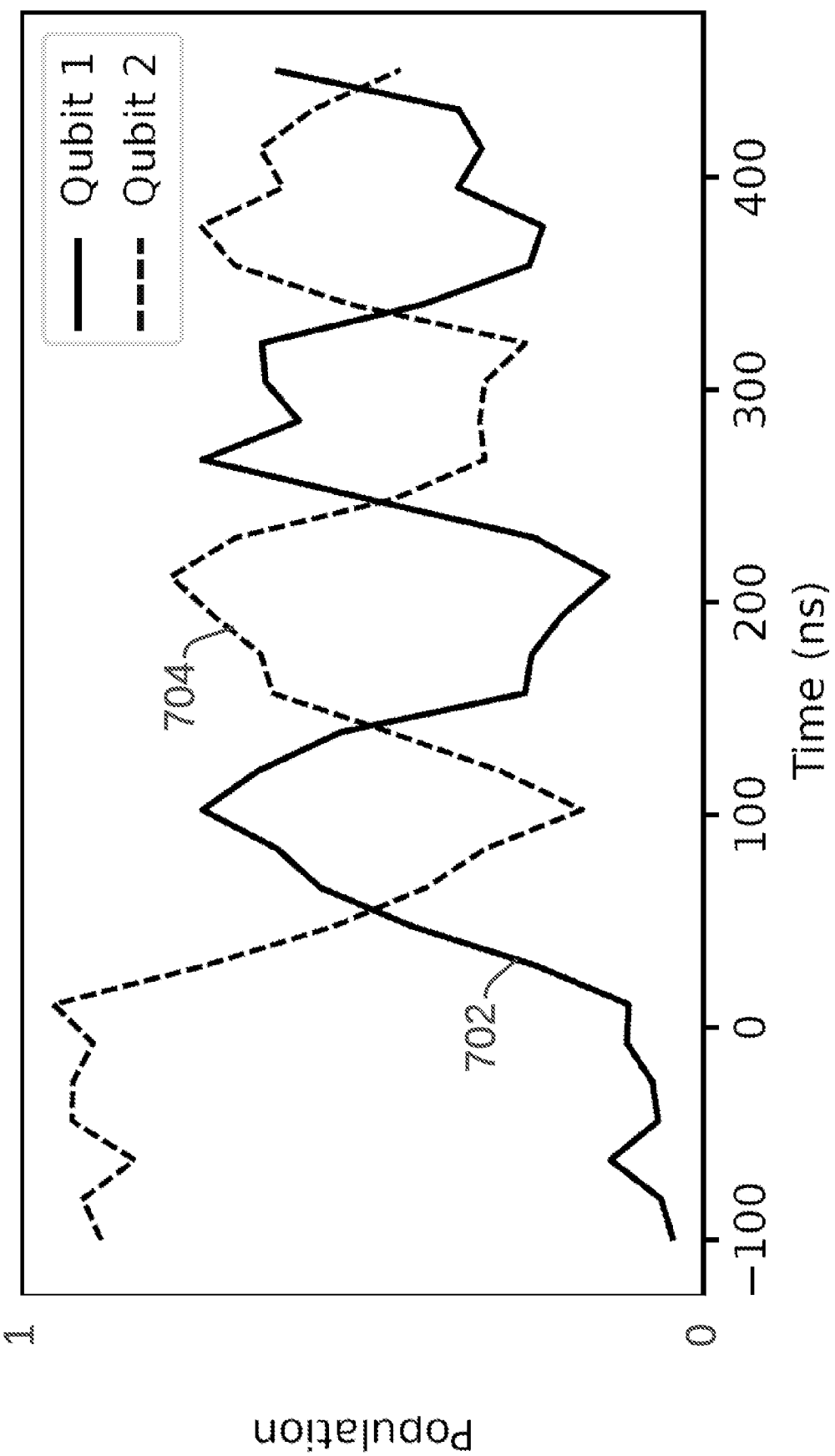
FIG. 7 is a graph showing an example of the population of two qubits as a function of time after application of a π pulse to a coupler.

In some embodiments, an iSWAP gate is performed by applying a first $\pi$ pulse followed by a second $\pi$ pulse delayed from the first $\pi$ pulse as the drive signal to the coupler. FIG. 7 plots the time evolution of the population of each data qubit over time after applying a $\pi$ pulse on the coupler at time=0. Curves 702 and 704 show that the $\pi$ pulse has an oscillating effect on the qubits, whereby populations are repeatedly swapped between the two data qubits. The oscillating effect continues until the coupler relaxes. Applying a second $\pi$ pulse to the coupler would return the coupler to its relaxed state, thus ending the oscillating effect. The second $\pi$ pulse may be applied after one or more swap cycles, for example at 100 ns, to turn off the coupling after the population has transferred from Qubit 2 to Qubit 1, thus resulting in a population swap, which can be used for an iSWAP gate. Note that the $\pi$ pulse can be calibrated by looking at the amplitude of the population swap as a function of the pulse power. Similarly, pulses corresponding to a rotation by any odd multiple of $\pi$ may be used.

Figure 8:
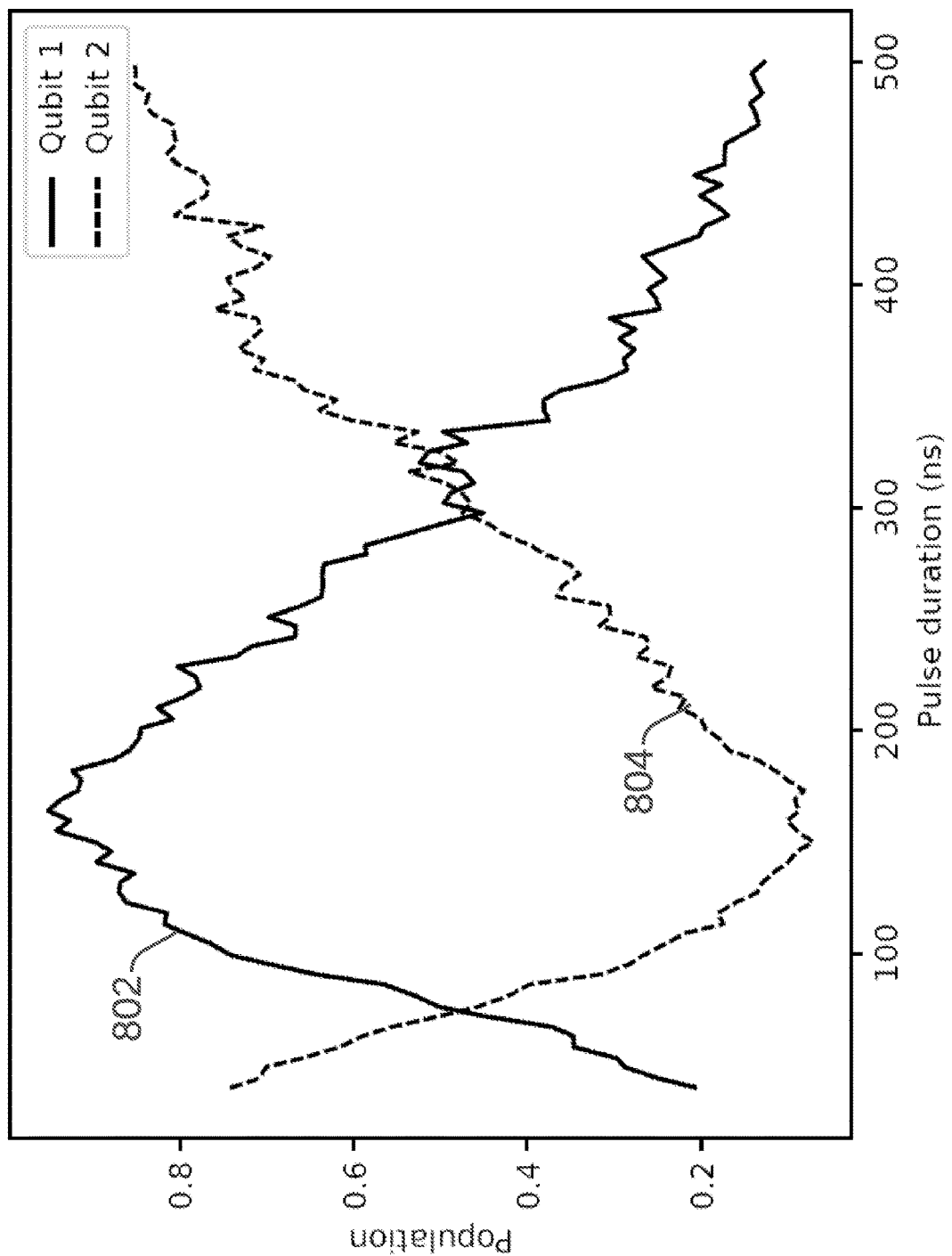
FIG. 8 is a graph showing an example of the population of two qubits as a function of pulse duration of a 2π pulse to a coupler.

In some embodiments, an iSWAP gate is performed by applying a $2\pi$ pulse having a duration that allows the data qubits to undergo a full population swap during the pulse. After the pulse, the coupler is back in its ground state and the data qubits stop interacting. The population transfer is maximal when the pulse duration matches the qubit coupling rate. FIG. 8 plots the population of the data qubits as a function of pulse duration. In this example, curves 802 and 804 show that the population transfer is maximal for a pulse duration of 160 ns. The optimal pulse duration will vary for different circuit implementations. In some embodiments, the drive signal is a pulsed signal having a duration between 10 ns and 200 ns.

Figure 9:
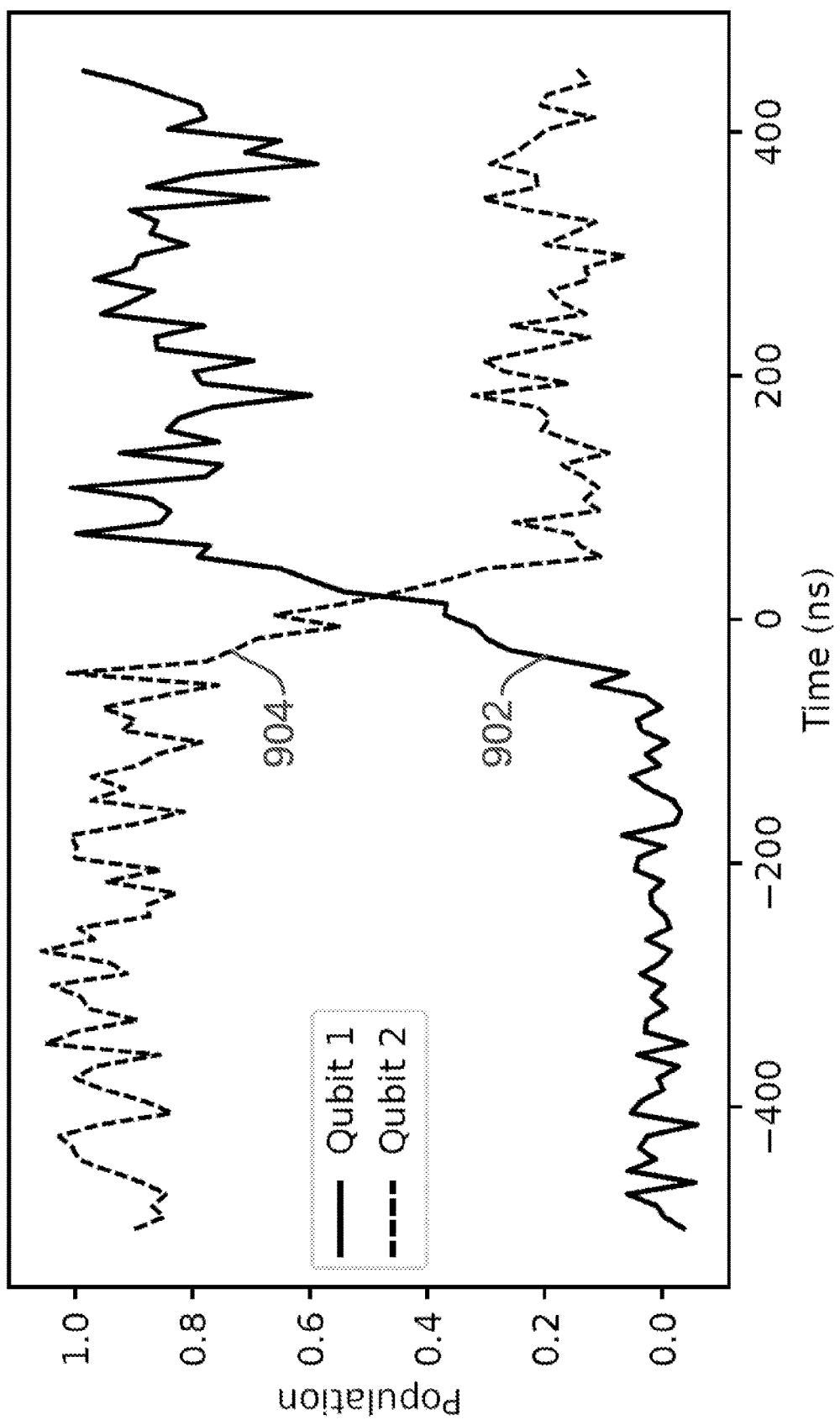
FIG. 9 is a graph showing an example of the population of the two qubits as a function of time after application of a 2π pulse to a coupler.

FIG. 9 plots the time evolution of the population in the data qubits after applying a $2\pi$ pulse having a duration of 160 ns on the coupler at time=0. Curves 902 and 904 show that after the pulse is applied and once the populations have swapped between qubits, no oscillations are observed. This confirms that the coupler is turned off after the pulse. Generally, a coupler drive pulse consisting in a rotation by any multiple of $2\pi$ would have the same effect since it would create non-zero population in the excited state of the coupler during the pulse and bring the population of the coupler back to the ground state at the end of the pulse.

In some embodiments, the two-qubit gate performed using the method 500 is a CZ gate. Indeed, a CZ gate may be performed in a manner similar to an iSWAP gate, except that the data qubits are at different frequencies separated by the anharmonicity parameter instead of having them in resonance.

In some embodiments, the two-qubit gate performed using the method 500 is any two-qubit gate within the fermionic simulation (fSim) family. The fSim gates are characterized by a swap angle $\theta$ and phase $\varphi$ of the |11⟩ state. The iSWAP and CZ gates are specific implementations of fSim gates with $(\theta, \varphi)=(90°, 0°)$ and $(\theta, \varphi)=(0°, 180°)$ respectively. The fSim family also includes the SWAP and $\sqrt{\text{iSWAP}}$ gates. The method 500 can implement any gate within the fSim family by varying the relative frequencies of the data qubits during the two-qubit gate and their effective coupling strength.

Figure 10:
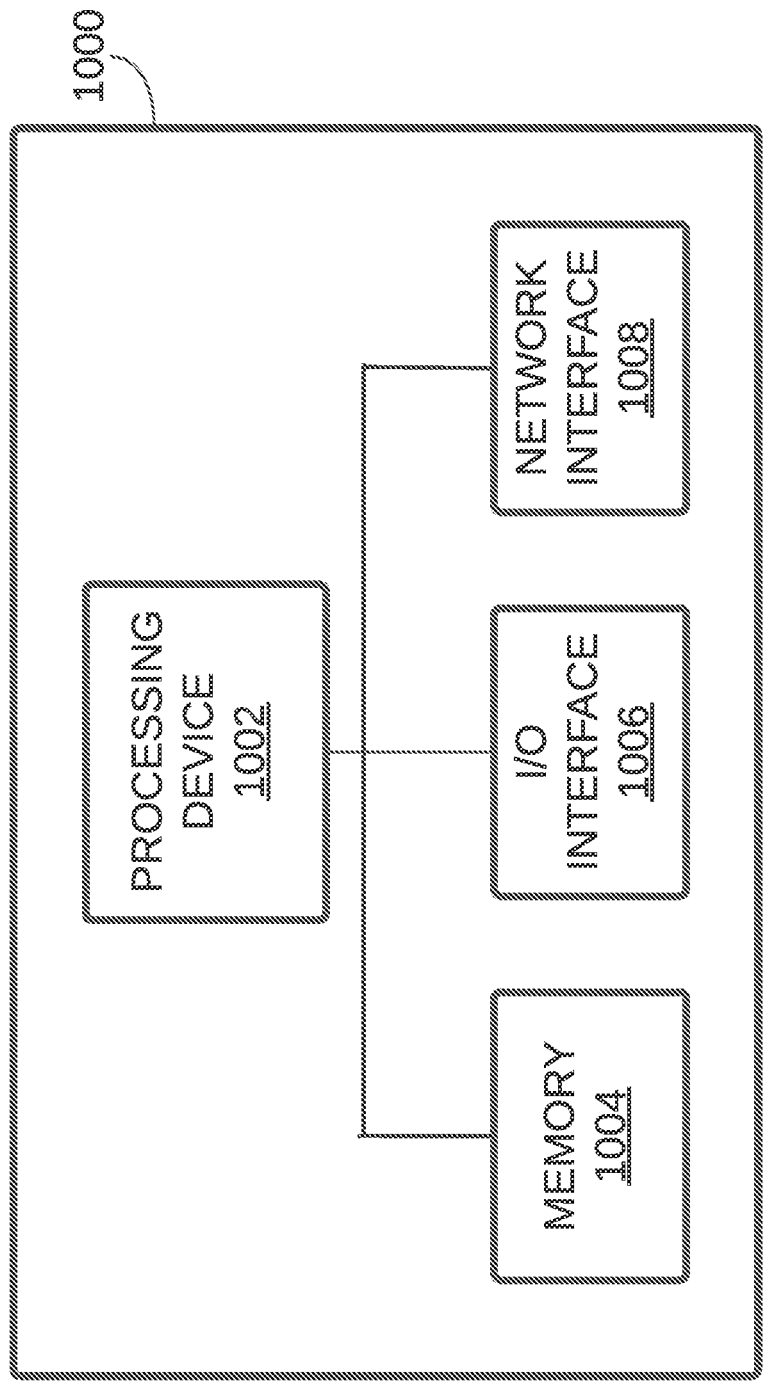
FIG. 10 is a block diagram of an example system for applying a two-qubit quantum gate.

In some embodiments, the method 500 is embodied as a set of instructions stored on a non-transitory computer-readable medium. The instructions are executable by a processing device for performing the two-qubit gate. FIG. 10 is an example system 1000 for implementing the method 500 in accordance with various embodiments. The system 1000 can be provided as part of a classical computer that interfaces with a quantum processor. The system 1000 can also be provided as a set of control electronics that interface with a quantum processor.

As depicted, the system 1000 can include one or more of a processing device 1002, a memory 1004, an input/output (I/O) interface 1006, and a network interface 1008. The processing device(s) 1002 may be an Intel or AMD x86 or x64, PowerPC, ARM processor, or the like. In some embodiments, the processing device(s) 1002 is a field programmable gate array (FPGA) or an application specific integrated circuit (ASIC), provided on one or more board. Each memory 1004 may include a suitable combination of computer memory that is located either internally or externally such as, for example, random-access memory (RAM), read-only memory (ROM), integrated memory, compact disc read-only memory (CDROM). In some embodiments, both an on-board high bandwidth memory and an off-board memory are provided.

Each I/O interface 1006 enables the system 1000 to interconnect with one or more other devices, such as a host computer, a network switch, and the like. The I/O interface 1006 can be used, for example, for receiving instructions for the processing device 1002. Various communication protocols may be used for communicating with the system 1000 through the I/O interface 1006, such as but not limited to Peripheral Component Interconnect Express (PCIe), Ethernet, InfiniBand, and the like.

Each network interface 1008 enables the system 1000 to communicate with other components, for example, through an API to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g., Wi-Fi, WiMAX), SS7 signaling network, fixed line, local area network, wide area network, and others.

The described embodiments and examples are illustrative and non-limiting. Practical implementation of the features may incorporate a combination of some or all of the aspects, and features described herein should not be taken as indications of future or existing product plans. Applicant partakes in both foundational and applied research, and in some cases, the features described are developed on an exploratory basis.

Although the embodiments have been described in detail, it should be understood that various changes, substitutions, and alterations can be made herein without departing from the scope. Moreover, the scope of the present disclosure is not intended to be limited to the particular embodiments of the process, machine, manufacture, composition of matter, means, methods and steps described in the specification.

As one of ordinary skill in the art will readily appreciate from the disclosure, processes, machines, manufactures, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufactures, compositions of matter, means, methods, or steps. As can be understood, the examples described above and illustrated are intended to be exemplary only.

The invention claimed is:

1. A method for performing a two-qubit gate, the method comprising:
coupling a first qubit to a second qubit;
coupling a third qubit to the first qubit and to the second qubit, wherein the third qubit is a coupler; and
applying a drive signal to the coupler to perform the two-qubit gate on the first qubit and the second qubit by driving the coupler, the drive signal creating coupling between eigenstates of a Hamiltonian of the coupler.

2. The method of claim 1, wherein the first qubit, the second qubit, and the third qubit are superconducting qubits.

3. The method of claim 2, wherein the superconducting qubits are transmon qubits.

4. The method of claim 1, wherein the drive signal is resonant with the coupler and produces a non-zero population in a first excited state of the coupler.

5. The method of claim 1, wherein the drive signal is off-resonance from the coupler and produces a frequency shift of the coupler.

6. The method of claim 1, wherein coupling the first qubit to the second qubit comprises coupling capacitively, and wherein coupling the third qubit to the first qubit and to the second qubit comprises coupling capacitively.

7. The method of claim 1, wherein the drive signal is applied through a transmission line shared between the coupler and the first qubit or the second qubit.

8. The method of claim 1, wherein the drive signal is applied through a transmission line capacitively coupled to the coupler.

9. The method of claim 1, wherein the two-qubit gate is an iSWAP gate.

10. The method of claim 1, wherein the two-qubit gate is a CZ gate.

11. The method of claim 1, wherein the two-qubit gate is a fermionic simulation gate.

12. The method of claim 1, wherein the first qubit and the second qubit are operated at a same frequency.

13. The method of claim 1, wherein the first qubit and the second qubit are operated at different frequencies.

14. The method of claim 1, wherein applying the drive signal to the coupler comprises applying a $2\pi$ pulse to the coupler.

15. The method of claim 1, wherein the first qubit and the second qubit are tunable-frequency qubits and the third qubit is a fixed-frequency qubit.

16. The method of claim 1, wherein the first, second and third qubits are tunable-frequency qubits.

17. The method of claim 1, wherein applying the drive signal to the coupler comprises applying a fixed-frequency signal with a modulated amplitude.

18. The method of claim 1, wherein applying the drive signal to the coupler comprises applying the drive signal at a transition frequency to populate higher energy states of the coupler.

19. The method of claim 1, wherein applying the drive signal to the coupler comprises using multi-photon absorption to populate higher energy states of the coupler.

20. The method of claim 1, wherein applying the drive signal to the coupler comprises applying multiple signals at different frequencies to transfer a population successively from one excited state to another excited state of the coupler.

* * * * *